United States Patent
Itoh et al.

(10) Patent No.: US 7,073,616 B2
(45) Date of Patent: Jul. 11, 2006

(54) CONTROLLER FOR HYBRID VEHICLE

(75) Inventors: Yoshiki Itoh, Shizuoka-ken (JP);
Tatsuji Mori, Shizuoka-ken (JP);
Norihiro Noda, Shizuoka-ken (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 169 days.

(21) Appl. No.: 10/760,838

(22) Filed: Jan. 20, 2004

(65) Prior Publication Data
US 2004/0144578 A1 Jul. 29, 2004

(51) Int. Cl.
*B60T 7/12* (2006.01)

(52) U.S. Cl. .................. 180/65.3; 180/197; 477/5; 701/71

(58) Field of Classification Search ........... 180/65.1, 180/65.2, 65.3, 197; 701/87, 71, 82; 477/5, 477/6, 8, 13, 168, 176, 174, 180, 57
See application file for complete search history.

(56) References Cited

U.S. PATENT DOCUMENTS

| | | | | |
|---|---|---|---|---|
| 5,856,709 A | * | 1/1999 | Ibaraki et al. | 290/45 |
| 5,982,045 A | * | 11/1999 | Tabata et al. | 290/17 |
| 5,984,034 A | * | 11/1999 | Morisawa et al. | 180/65.2 |
| 6,183,389 B1 | * | 2/2001 | Tabata | 477/5 |
| 6,199,650 B1 | * | 3/2001 | Masberg et al. | 180/197 |
| 6,364,807 B1 | * | 4/2002 | Koneda et al. | 477/5 |
| 6,428,444 B1 | * | 8/2002 | Tabata | 477/3 |
| 6,726,593 B1 | * | 4/2004 | Yamamoto et al. | 172/500 |
| 2002/0058565 A1 | * | 5/2002 | Yamamoto et al. | 477/5 |

FOREIGN PATENT DOCUMENTS

| | | |
|---|---|---|
| JP | 09-84210 | 3/1997 |
| JP | 2002-147600 | 5/2002 |

* cited by examiner

*Primary Examiner*—Christopher P. Ellis
*Assistant Examiner*—Kelly E Campbell
(74) *Attorney, Agent, or Firm*—Flynn, Thiel, Bourtell & Tanis, P.C.

(57) ABSTRACT

A controller for a hybrid vehicle includes a slip controller which controls a lockup mechanism to slip in a set driving range, and an assist limiter which restricts assist of the motor generator in the range where slip occurs.

7 Claims, 3 Drawing Sheets

DIAGRAM OF LOCKUP (EXAMPLE)

CALCULATION TABLE FOR BASIC ASSIST TORQUE

CONTROLLER FOR HYBRID VEHICLE

CROSS REFERENCE TO RELATED APPLICATIONS

This application is related to the following copending applications: (1) Ser. No. 10/760,839 filed concurrently herewith, and titled "CONTROLLER FOR HYBRID VEHICLE"; (2) Ser. No. 10/760,837 filed concurrently herewith, and titled "ELECTRIC POWER REGENERATION CONTROLLER FOR HYBRID VEHICLE"; and (3) Ser. No. 10/760,840 filed concurrently herewith, and titled "CONTROLLER FOR HYBRID VEHICLE", the entire disclosures of which are herein incorporated by reference.

FIELD OF THE INVENTION

This invention relates to a controller for a hybrid vehicle, and more particularly, a vehicle drive system wherein a motor generator is connected to a crankshaft of an engine and assists the output of the engine, and the controller for the hybrid vehicle controls assist torque in combination with an automatic transmission equipped with a lockup mechanism.

BACKGROUND OF THE INVENTION

In vehicles, there is a hybrid vehicle in which an engine driven by combustion of fuel is directly connected to a motor generator (assist motor) driven by electric power and having a power generating function. This hybrid vehicle may include the engine, the motor generator to drive and assist the engine, and an automatic transmission equipped with a torque converter having a lockup mechanism (i.e., a clutch).

The hybrid vehicle is conventionally provided with the engine, the motor generator (assist motor) to improve fuel efficiency, and the automatic transmission with the torque converter. The lockup mechanism (clutch) is associated with the torque converter so as to improve transmission efficiency of the torque converter (see JP Application Laid-Open No. 2002-147600).

Another example of the hybrid vehicle includes the motor generator (assist motor) as well as the engine, and the motor generator assists the driving torque in a range where the engine load is heavy, whereas the motor generator does not assist the driving torque in a range where the engine load is light, so that the motor is driven frequently in a range where the efficiency of the engine is relatively high. The load range for assisting is expanded toward the lighter side if the amount of battery remaining is enough (see JP Application Laid-Open No. H09-84210).

The automatic transmission with the torque converter is equipped with the lockup mechanism (e.g. clutch) to improve transmission efficiency of the torque converter. The lockup clutch is controlled to lockup in a high-speed range where variation of the engine torque is permissible, and to permit slip in a mid-speed range where the variation of the engine torque is not permissible. Generally, the range for slipping is limited to a low-to-mid load range to maintain durability, since the slipping lockup mechanism produces frictional heating.

In a conventional controller for the hybrid vehicle which controls the assist torque in combination with the automatic transmission with the torque converter in which the lockup mechanism (clutch) can be slipped, assisting by the motor in the slip range increases the heating value of the lockup mechanism in comparison to a case where the motor does not assist, thereby reducing durability of the lockup mechanism. To obviate this problem, the slip range may be narrowed toward the lighter load side. However, this increases fuel consumption.

SUMMARY OF THE INVENTION

In order to obviate or minimize the above-mentioned inconveniences, the present invention provides a controller for a hybrid vehicle having an engine, an electric motor-generator to assist and drive the engine, and an automatic transmission equipped with a torque converter. In this controller, a slip controller controls to allow slip of a lockup mechanism in a set driving range. An assist limiter restricts assist of the motor-generator in driving the engine in the range where slip occurs.

According to the present invention, the assist limiter restricts assist of the motor-generator in the range where slip occurs, thereby reducing the assist of the motor-generator and therefore improving the durability of the lockup mechanism. In addition, there is no need to reduce the amount of slipping and the range of slipping, thereby reducing fuel consumption. As a result, slipping of the lockup and assisting of the motor-generator are compatible.

DETAILED DESCRIPTION

FIGS. 1–5 illustrate an embodiment of the present invention.

Figure 5:
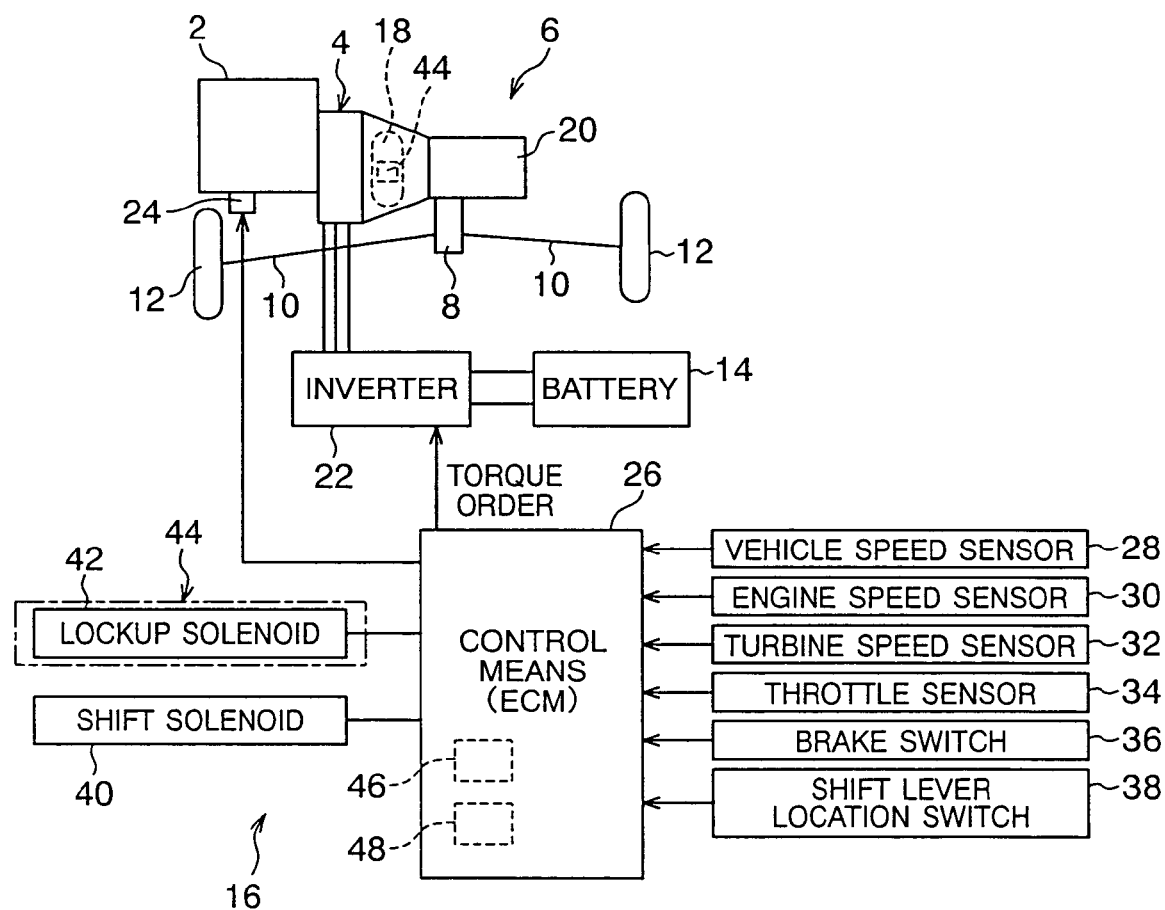
FIG. 5 is a systematic diagram of the controller for the hybrid vehicle.

FIG. 5 shows an engine 2 mounted on a hybrid vehicle (not shown), an electric motor-generator (assist motor) 4 in connection with a crankshaft (not shown) of the engine 2, an automatic transmission 6, a differential 8, drive shafts 10, drive wheels 12, a battery 14, and a controller 16. The engine 2 is driven by combustion of fuel. The electric assist motor 4 is driven by the electric power and also functions as a generator. The automatic transmission 6 includes a fluid torque converter 18 and a speed change section (gearing section) 20. This fluid torque converter 18 includes a pump, a stator, and a turbine, which are not shown. The torque is multiplied and transmitted from the pump side to the turbine side of the transmission.

The controller 16 controls the transmission of torque output from either the engine 2 or the motor 4 to the drive wheels 12 through the automatic transmission 6.

The battery 14 is connected to the electric motor 4 through an inverter 22.

The engine 2 is equipped with a fuel injection valve 24 which connects with a control means (electronic control module ECM) 26 which is part of the controller 16. This control means 26 is connected to the inverter 22 so as to provide the motor 4 with the torque order. Control means 26 also receives signals from a vehicle speed sensor 28 to detect the vehicle speed, an engine speed sensor 30 to detect the engine speed, the turbine speed sensor 32 to detect rotational speed of a turbine of the fluid torque converter 18, a throttle sensor 34 to detect opening angle of a throttle, a brake switch 36 to detect a state in which a brake pedal (not shown) is depressed, and a shift lever position switch 38 to detect location of a transmission shift lever (not shown). The control means 26 is also connected to a shift solenoid 40 in the gearing section 20 of the automatic transmission 6, and a lockup solenoid 42 in the torque converter 18. The lockup solenoid 42 forms part of a lockup mechanism (e.g. clutch) 44 in the torque converter 18. The lockup mechanism (clutch) 44 is controlled to lockup in a high load range, and slip in a low-to-middle load range.

The control means 26 includes a slip controller 46 and an assist limiter 48. The slip controller 46 controls the lockup mechanism 44 to allow slip in a set driving range, and the assist limiter 48 restricts the assist of the motor generator 4 in the range where slip occurs.

Figure 3:
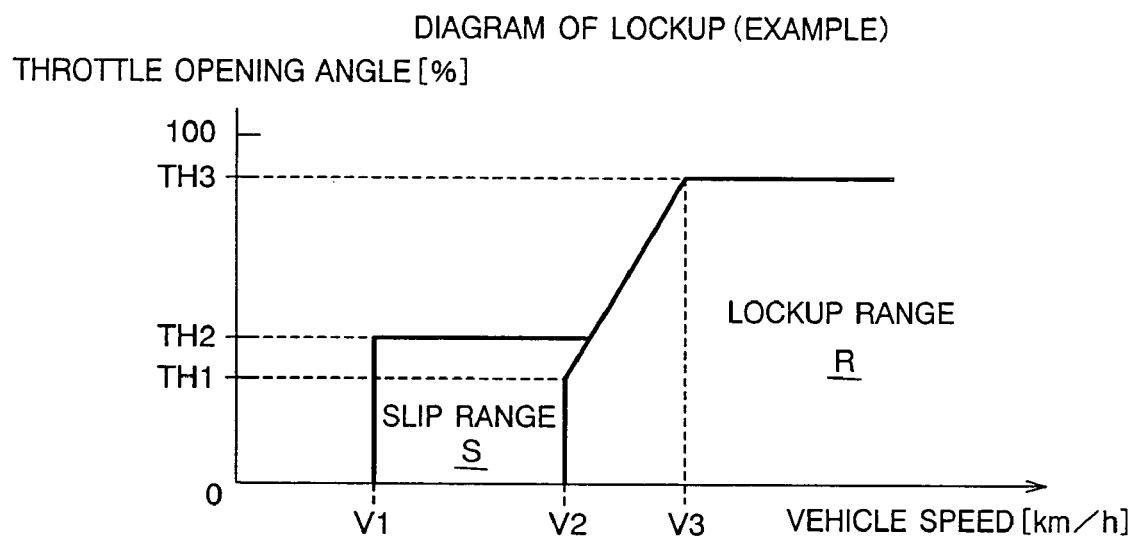
FIG. 3 is a diagram showing a slip range.

As shown in FIG. 3, the slip controller 46 has a slip range S defined by the engine speed and the throttle angle. More particularly, the slip range is defined between the vehicle speeds V1 and V2, and between the zero degree (closed) and the TH2 degree positions of the throttle angle. Also a lockup range R is defined by engine speeds higher than V2 and throttle angles below TH3, which throttle angle is increasing from TH1 to TH3 (TH1<TH2<TH3) as the vehicle speed increases from V2 to V3. Thereby, the slip controller 46 permits the lockup mechanism 44 to slip in the set slip range S.

Figure 2:
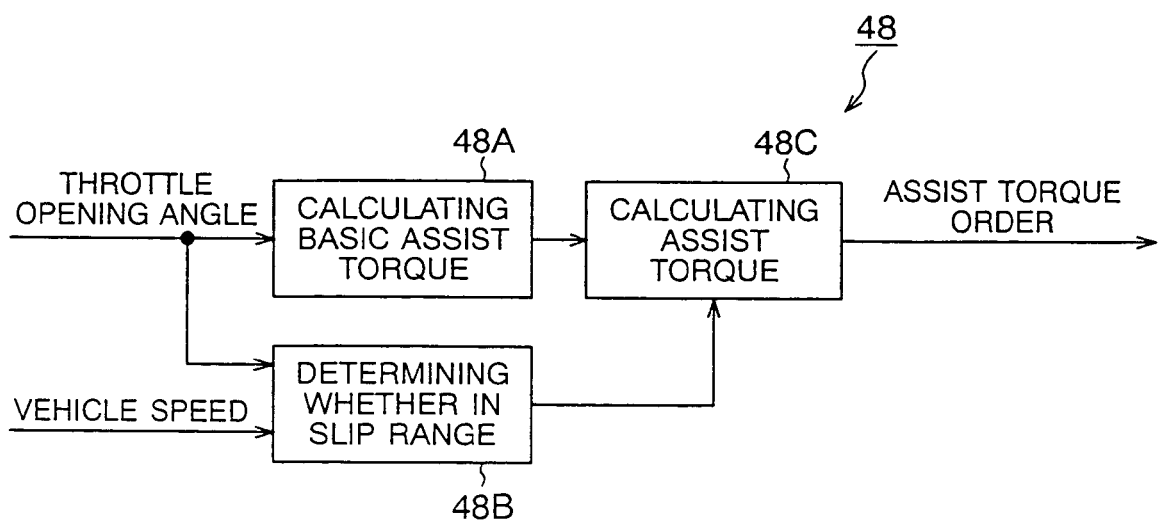
FIG. 2 is a block diagram of a slip controller.
Figure 4:
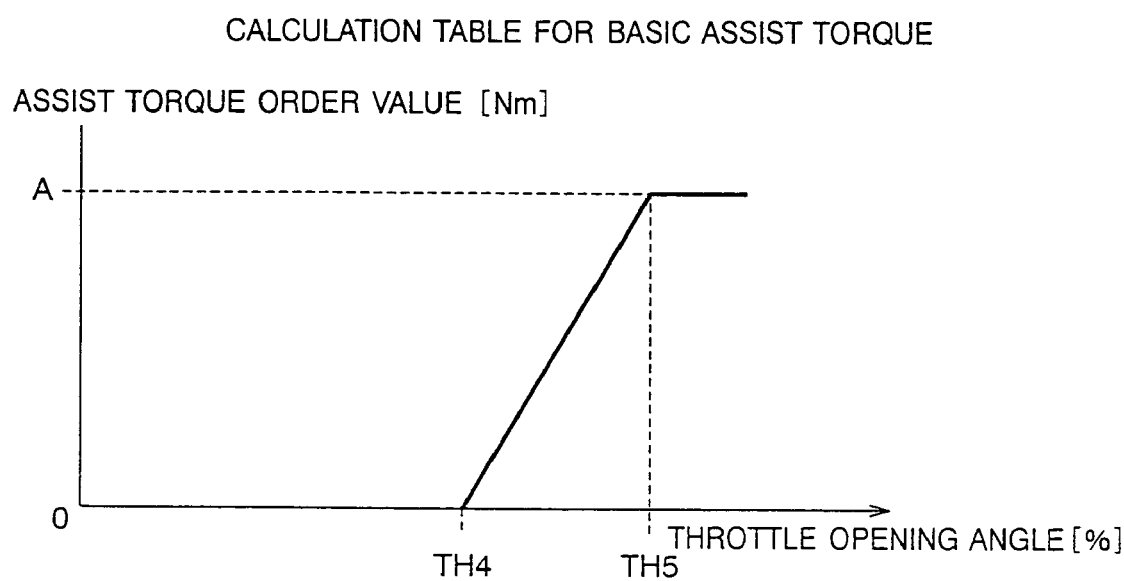
FIG. 4 is a calculation table for basic assist torque.

The assist limiter 48 restrains assist of the motor generator 4 in the slip range S where the slip controller 46 performs slip control. Referring to FIG. 2, the assist limiter 48 includes a basic assist torque calculating section 48A, a slip range determining section 48B, and an assist torque calculating section 48C. More particularly, the basic assist torque calculating section 48A calculates basic output torque basic assist torque of the motor generator 4 based on the throttle opening angle (FIG. 4). The slip range determining section 48B determines whether the lockup mechanism is in the slip range S for the slip controller 46 from the throttle angle and the vehicle speed (FIG. 3). The assist torque calculating section 48C calculates the assist torque or output torque which is the basic assist torque determined in Section 48A corrected by a slip value in the slip range S as determined in Section 48B.

As shown in the table of FIG. 4, with regard to the basic assist torque calculating section 48A, assist torque order value starts to increase at the throttle angle TH4 and is maintained at a constant value A when the throttle angle equals or exceeds TH5.

It is noted that assist limitation by the assist limiter 48 means that the motor generator 4 does not assist the engine.

Alternatively, the amount of assist the assist limiter 48 limits is based on the engine torque.

Figure 1:
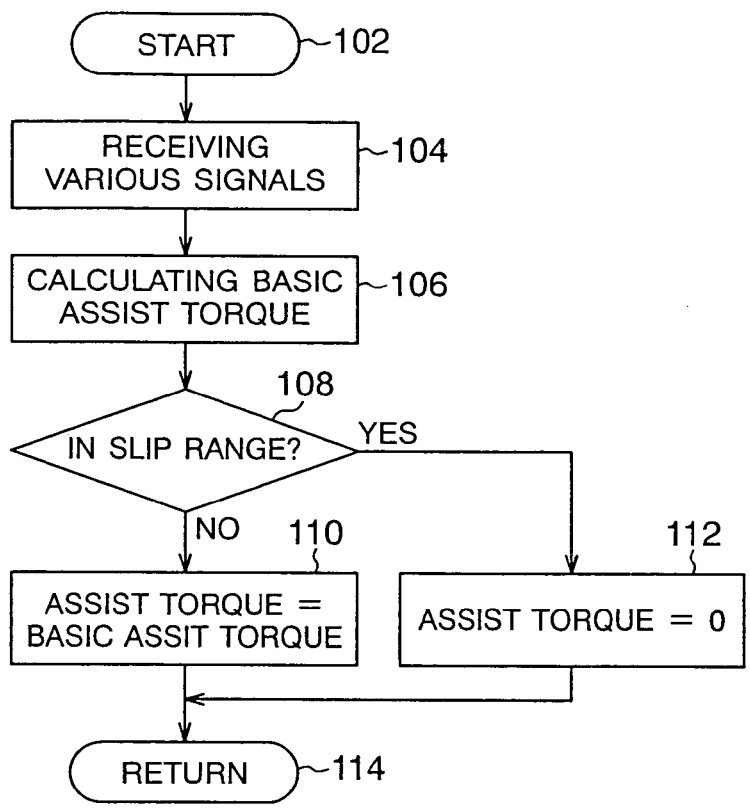
FIG. 1 is a flowchart for control of a hybrid vehicle according to the present invention.

The operation of the embodiment of the invention is described as follows with reference to the flowchart in FIG. 1.

A control program for the assist limiter 48 starts at step 102. The assist limiter 48 receives signals from various sensors at step 104. The basic assist torque is calculated at step 106. A determination is made at step 108 whether the lockup clutch is in the slip range S.

If the determination at step 108 is "NO", then the assist torque is set at the basic assist torque at step 110.

If the determination at, step 108 is "YES", the assist torque is set at zero so as not to assist the motor generator 4 at step 112.

After the steps 110 and 112, the program returns at step 114.

As a result, in the hybrid vehicle having the engine 2 and the assisting motor 4 on the input side of the automatic transmission 6 equipped with the fluid torque converter 18, the assist of the motor generator 4 is restrained in the slip range where the lockup mechanism 44 of the torque converter 18 slips. This reduces the amount of assist of the motor generator 4 and therefore improves the durability of the lockup mechanism 44. In addition, there is no need to reduce the amount of slipping and the range of slipping. As a result, slipping of the lockup 44 and assisting of the motor generator 4 are compatible.

The assist limiter 48 prevents the motor generator 4 from assisting, thereby improving the durability of the lockup mechanism 44.

Further, the amount the assist limiter 48 permits assist of the motor generator 4 is based on the engine torque, so that precise assist control is achievable.

Incidentally, in this embodiment of the present invention, the torque assist is limited in the slip range. To obtain the same result, it is only necessary to configure the system such that the transmission input torque does not affect the durability of the lockup mechanism. For example, the maximum value of the assist torque can be calculated based on the engine torque calculated from intake air quantity, and the assist torque is set at this calculated maximum value.

As thus described, the controller for the hybrid vehicle includes the slip controller to control the lockup mechanism to slip in a set driving range, and the assist limiter to restrict assist of the motor generator in the range where slip occurs. This reduces the assist of the motor generator and therefore improves the durability of the lockup mechanism. In addition, there is no need to reduce the amount of slipping and the range of slipping, thereby reducing fuel consumption. As a result, slipping of the lockup and assisting of the motor generator are compatible.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A controller for a hybrid vehicle having an engine, an electric motor-generator to assist and drive said engine, said motor-generator being connected to a crankshaft of the engine, and an automatic transmission equipped with a torque converter that transmits torque from both the engine and the motor-generator to wheels of the vehicle, the torque converter including a lockup mechanism providing slip control in a low-to-mid vehicle speed range and lockup control in a high vehicle speed range, the controller comprising: a slip controller for performing said slip control such that an amount of slipping of the lockup mechanism is determined irrespective of the amount of assistance the motor-generator is providing to the engine, and an assist control that controls the amount of assistance said motor-generator is providing to the engine, wherein the assist control is controlled based on engine torque.

2. The controller for a hybrid vehicle according to claim 1, wherein the assist control further controls the amount of assistance said motor-generator provides the engine by preventing the assistance in the low-to-mid vehicle speed range.

3. The controller for a hybrid vehicle according to claim 1, wherein the assist control reduces the amount of assistance said motor-generator provides the engine when the slip control is being provided, by the lockup mechanism.

4. A controller for a hybrid vehicle having: an engine which generates a respective torque for driving a crankshaft thereof, an electric motor-generator connected to said crankshaft, said motor-generator generating a respective torque which assists and drives said engine, and an automatic transmission equipped with a torque converter that transmits said torque of said engine and said motor-generator to wheels of the vehicle, said torque converter including lockup mechanism which provides slip control in a slip range corresponding to low-to-mid vehicle speed wherein slip is allowed in said torque converter, and lockup control in a lockup range corresponding to high vehicle speed wherein said lockup mechanism is locked up without slippage, the controller comprising:

a slip controller which controls said slip control such that an amount of slipping of said lockup mechanism is determined irrespective of the amount of assistance the motor-generator is providing to said engine in said slip range, and an assist control which controls the amount of assistance said motor-generator is providing to said engine wherein said amount of assistance is reduced by said assist control in said slip range relative to said amount of assistance provided in the lockup range.

5. The controller for a hybrid vehicle according to claim 4, wherein said controller determines whether the vehicle is operating in said slip range or said lockup range.

6. The controller for a hybrid vehicle according to claim 4, wherein said assistance provided by said motor-generator is prevented by said assist control in said slip range.

7. The controller for a hybrid vehicle according to claim 6, wherein said assist control determines the amount of assistance being provided by said motor-generator based on the engine torque.

\* \* \* \* \*